United States Patent [19]

Pfalzgraf

[11] Patent Number: 4,785,781

[45] Date of Patent: Nov. 22, 1988

[54] DEVICE FOR TRANSMITTING THE POSITION OF A CONTROL ELEMENT WHICH CAN BE ACTUATED BY THE DRIVER OF A VEHICLE

[75] Inventor: Manfred Pfalzgraf, Frankfurt am Main, Fed. Rep. of Germany

[73] Assignee: VDO Adolf Schindling AG, Frankfurt am Main, Fed. Rep. of Germany

[21] Appl. No.: 128,463

[22] Filed: Dec. 3, 1987

[30] Foreign Application Priority Data

Dec. 3, 1986 [DE] Fed. Rep. of Germany ....... 3641275

[51] Int. Cl.⁴ ............................................. F02D 11/10
[52] U.S. Cl. ................................ 123/396; 123/198 D
[58] Field of Search ............... 123/396, 397, 349, 400, 123/403, 361, 198 D

[56] References Cited

U.S. PATENT DOCUMENTS

| | | | |
|---|---|---|---|
| 2,077,555 | 4/1937 | Franks | 123/396 |
| 2,111,284 | 3/1938 | Girl et al. | 123/396 |
| 3,379,187 | 4/1986 | Armbrust | 123/198 D |
| 3,528,523 | 9/1970 | Thorner | 123/396 |
| 3,699,943 | 10/1972 | Erhelman | 123/198 D |
| 3,704,635 | 12/1974 | Erhelman | 123/198 D |
| 3,888,219 | 6/1975 | Rogarsin | 123/198 D |
| 4,019,475 | 4/1977 | Nuss | 123/396 |
| 4,205,639 | 6/1980 | Kawase et al. | 123/396 |
| 4,419,973 | 12/1973 | Collonia | 123/396 |
| 4,424,785 | 1/1984 | Ishida et al. | 123/399 |
| 4,458,645 | 7/1984 | Schwartzman | 123/396 |
| 4,541,378 | 9/1985 | Kitamura | 123/399 |
| 4,727,837 | 3/1988 | Sturdy | 123/396 |

*Primary Examiner*—Raymond A. Nelli
*Attorney, Agent, or Firm*—Martin A. Farber

[57] ABSTRACT

In a device for transmitting the position of a control element (1) which is actuatable by the driver of a vehicle between an idling position and a full-gas position via an electric set-value transmitter (2) which is displaceable by the control element and via electric transmission means, particularly a regulator (3), to a setting member (6) which is displaceable in corresponding manner between the idling position and the full-gas position, which member is coupled by coupling means (12, 13) to a actuating member which controls the fuel/air mixture of an internal combustion engine, an emergency-operation capability is to be obtained by a mechanical safety transmission element. For this purpose, the position of the control element is to be transmitted by the mechanical safety transmission element to the actuating member. In order for this to take place reliably even in cases of unfavorable disturbance and particularly upon a blocking of the setting member, a controllable coupling (11) which is automatically opened in case of disturbance is arranged between the setting member and the actuating member.

11 Claims, 5 Drawing Sheets

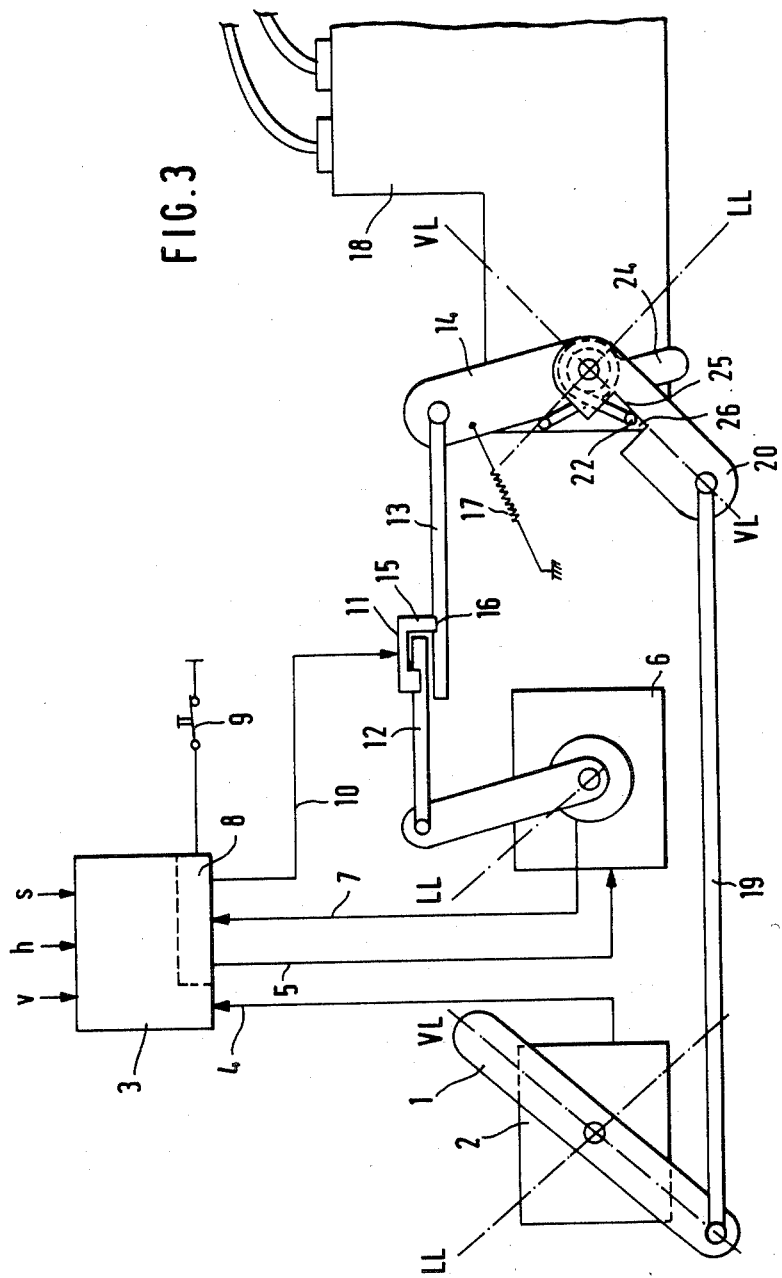

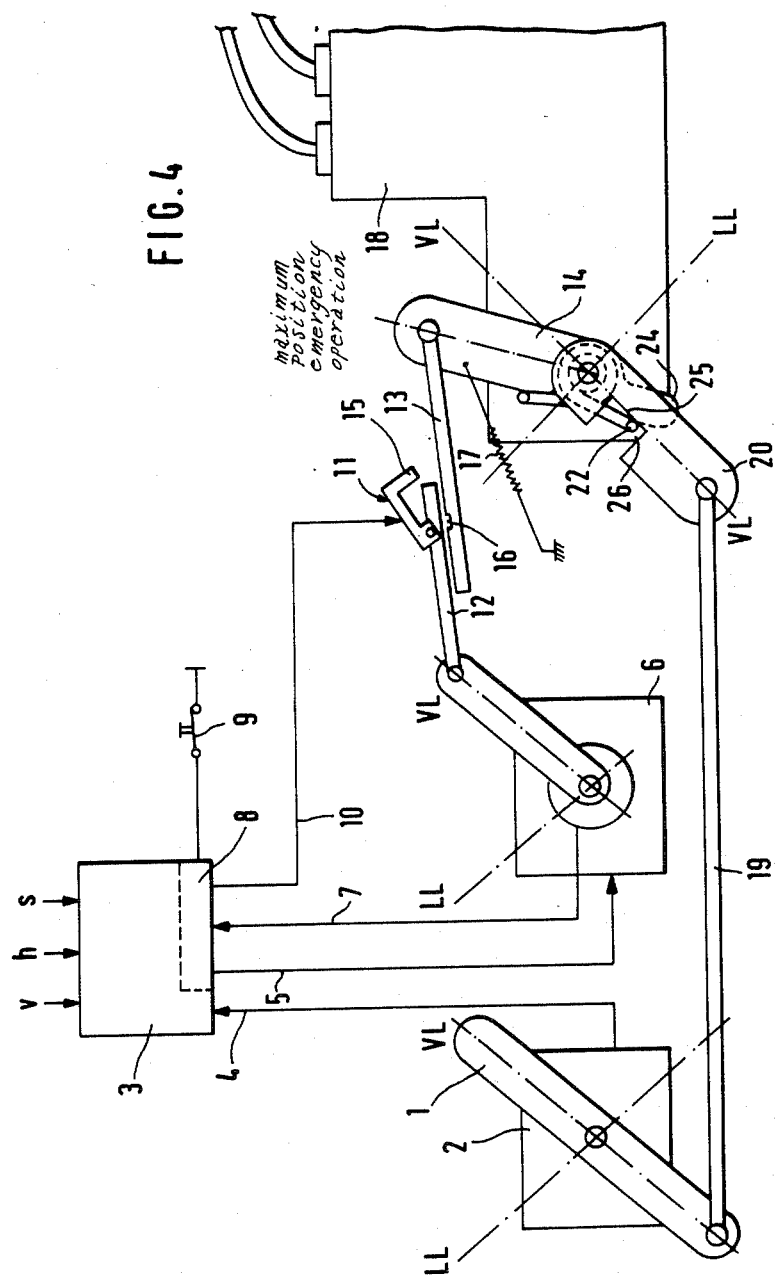

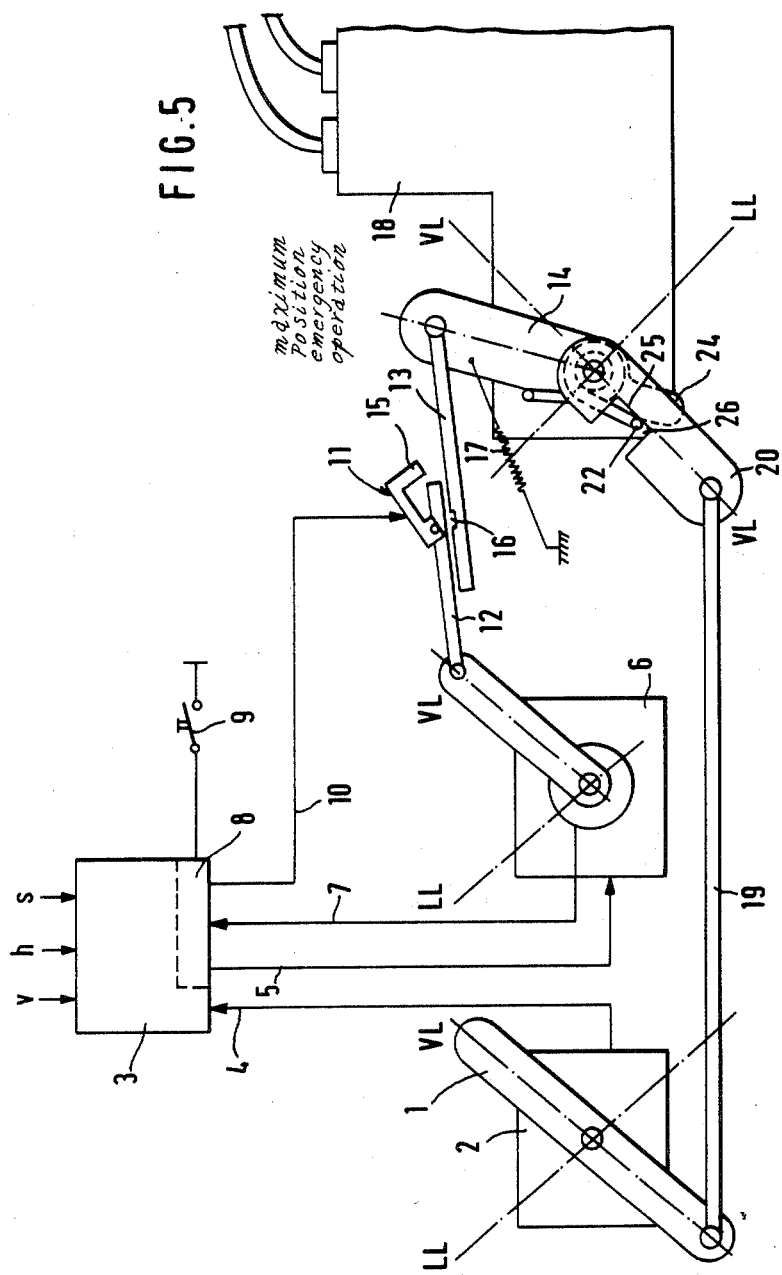

DEVICE FOR TRANSMITTING THE POSITION OF A CONTROL ELEMENT WHICH CAN BE ACTUATED BY THE DRIVER OF A VEHICLE

FIELD AND BACKGROUND OF THE INVENTION

The present invention relates to a device for transmitting the position of a control element which can be actuated by the driver of a vehicle.

There is known a device for transmitting the position of a control element which is actuatable by the driver of a vehicle between an idling position and a full-gas position via an electric set-value transmitter which can be displaced by the control element, and via electric transmission means, to a setting member which can be displaced in corresponding manner between an idling position and a full gas position, said member being coupled by coupling means to a actuating member which controls the fuel/air mixture of an internal combustion engine, having at least one mechanical safety transmission element arranged between the control element of the set-value transmitter and the actuating member, by which transmission element the position of the control element can be transmitted to the actuating member.

In such known devices the transmitting of the position of the control element, i.e. customarily the position of the gas pedal, to the throttle valve of a carburetor or the control rod of an injection pump normally takes place electrically via the set-value transmitter coupled to the gas pedal and via electric transmission means which comprise, in addition to wires, an electronic regulator or an electronic control device, to the electric setting member (EP-A1-No. 0123731). The setting member, in its turn, is continuously coupled mechanically in form-locked and force-locked manner to the throttle valve or the control rod which forms the actual actuating member. In order that such an electronically controlled automotive vehicle remain maneuverable even in those rare cases of disturbance in which the position of the set-value transmitter is not transferred correctly to the setting member and the actuating member, at least one mechanical safety transmission element is arranged functionally in parallel with the electric transfer means between the control element of the set-value transmitter or the set-value transmitter itself and the actuating member, in such a manner that upon normal operation of the electric transmission means the safety transmission element is moved along without force by the control element, but in the event of a disturbance in the electric transmission means, it takes over the transmission of the position of the control element to the actuating member. In this way the vehicle automatically is imparted so-called emergency operation capability. In detail, the at least one safety transmission element can consist of an emergency-operation rod or else a Bowden cable. In order that unintentional racing of the engine in the event of a defect be avoided, the actuating member is urged into its idling position by a restoring spring. In order not to act on the safety transmission element upon normal operation of the electric set-value transmitter of the electric transmission means and of the electric setting member, the mechanical safety transmission element can be arranged on the setting member freely movable by a predetermined clearance or play in the direction of displacement, said clearance or play being less than the maximum displacement path. By means of this clearance assurance is also had that if the device is intact the setting member and the actuating member can move unimpeded into a position closer to the idling position than corresponds to the instantaneous set-value transmitter position, for example if the position of the setting member is determined not only by the set-value transmitter position but by additional functions. Such additional functions comprise, for instance, a final speed of rotation limitation or a thrust disconnect. These additional functions are carried out by an electronic regulator. If the safety transmission element has a so-called compensation element which consists essentially of two parts displaceable opposite each other as well as an over-stroke spring, one of the two parts being connected to the setting member and the other to the set-value transmitter or the control element then, particularly in case of a defect in the set-value transmitter but with the electronic regulator still operating, the setting member and the actuating member are moved in the direction towards the idling position although the safety transmission element has already produced a form-locked coupling between the control element and the actuating member after going beyond the clearance. In this device the spring force of the over-stroke spring is greater than that of the return spring. For this reason, by actuation of the control element in the direction of full gas, maneuverable travel operation can take place if one of the electronic elements or parts has failed so that the return spring would move the actuating member into idling position. In this connection the safety transmission element, to be sure, is acted on not only by the force of the return spring but also by frictional and/or adherence forces of the setting member and the coupling means which connect the setting member to the actuating member. When the setting member is blocked, the actuating member can no longer be actuated with the mechanical safety transmission element. Emergency operation is no longer possible. If the setting member is in this situation near the full gas position then, to be sure, by an ordinary known safety system, the feeding of fuel or the ignition can be disconnected in order to avoid danger by uncontrolled operation but in this case the fact is tolerated that the vehicle remains stopped, as a result of which, in unfavorable traffic situations, vehicle and passengers can once again be endangered.

It is an object of the present invention therefore to further increase the safety of a device for the transmission of the position of a control element actuatable by the driver of a vehicle and, in particular, to assure emergency operation capabilities of the vehicle even in case of unfavorable disturbances in connection with which the control member can otherwise not be actuated. At the same time, a release of the mechanical safety transmission element from load is also to take place in these special cases of disturbance. The improved device furthermore is to be characterized by high dependability in operation and the possibility of reliable control of function.

SUMMARY OF THE INVENTION

According to the invention, a controllable coupling (11) is arranged between the setting member (6) and the actuating member (actuating-member lever 14) and the coupling is automatically opened in the case of a disturbance.

The invention proceeds from the basis that of the heretofore substantially equivalent possibilities of arranging the safety transmission element on the actuating member or the setting member, arrangement on the actuating member is selected, that between the setting, member and the actuating member a controllable coupling is arranged, and that the coupling automatically opens in the event of a disturbance.

In this way the result is obtained that in the event of a disturbance in the electric transmission of the position of the gas pedal to the output of the setting member the mechanical actuation of the actuating member is no longer impeded by the safety transmission element. This is true, for instance, in the case of a current failure of the plant or the electric transmission elements. In particular, however, assurance is thereby had that even if the setting member is blocked, the emergency operation capabilities of the vehicle are maintained. In particularly advantageous embodiments, the maximum position of the actuating-member lever in the direction towards the full-gas position is limited in emergency operation by the clearance. The limit of the clearance is formed by the edge of the cutout on the transmission lever on the one end of which the over-stroke spring comes to rest. By the limited maximum position in emergency operation the attention of the driver is directed to the disturbance in a manner which increases safety.

The device for transmitting the position of the control element with emergency operating capabilities can be checked in convenient manner, for instance, before starting. This is important, since the emergency operating capability is only rarely activated during the operation of the vehicle, but must then operate reliably. The testing possibility is based on the fact that the controlled coupling (11) can be opened by an arbitrarily actuatable test-signal transmitter (8, 9).

Further according to a feature of the invention, the test signal transmitter (8, 9) is adapted to give off test signals to the setting member (6) while the controllable coupling (11) is simultaneously open.

The test signal can, in particular, consist therein that the controllable electric coupling (11) is without current in the event of a disturbance and in the test case so that it is actuated in the same manner as in the case of disturbance due to failure of the electric system of the vehicle. During the opening of the coupling for the testing, the rest of the device can be acted on by other input signals and the reaction of the actuating member to these input signals can be evaluated. The first test case consists in a checking of the safety transmission means between the control element and the actuating-member element. With controllable coupling opened by the test signal, the control element is moved into the full gas position and it is checked whether the actuating member element or the actuating-member lever comes into the maximum position for the emergency operation. The second test case, which is also carried out with the controllable coupling open, establishes a well-defined condition of operation by the electric setting signal on the setting member, for instance a given load position (full gas), a given speed of rotation, thrust recognition and the like. It is then checked whether the internal combustion engine nevertheless assumes or retains an operating condition which is not determined by the position of the setting member.

For example, when the setting member is in the full gas position the engine must not race.

From the above operating description it can be noted that in many cases of use an electrically controlled coupling (11) can advantageously be used as the controlled coupling between the setting member (6) and the setting member (actuating-member lever 14), since this coupling can directly receive electric control signals.

An electromagnetically actuated detent connection (detent 15) is particularly suitable as the controlled coupling between setting member (6) and actuating member (14). By electromagnetic actuation of the detent connection, a form-locked and force-locked connection is produced between the setting member and the actuating member, these two elements assuming a predetermined relative position with respect to each other.

As variant of the controlled coupling there can be arranged between the setting member and the actuating member a pneumatic cylinder with piston which can be actuated by means of pressurized air or vacuum. For the opening of the coupling the pneumatic cylinder can be vented via a control valve so that the piston can move with respect to the cylinder and thus the actuating member can move relative to the setting member.

Also according to the invention, the pneumatic cylinder is connected to a vent valve for the decoupling of the actuating member from the setting member.

Still further it may be provided that the coupling (11) can be controlled by a disturbance signal which is given off by an error-detection device (8) which is coupled to the electric transmission means (regulator 3).

The disturbance signal which actuates the controlled coupling can be produced automatically by an intelligent error-detection device which, for instance, recognizes that the reported position of the setting member differs considerably from the position which the setting member should have assumed on basis of the setting signals.

According to another feature of the invention there is provided a device in connection with which the setting member is urged into its idling position by a return spring, wherein the controllable coupling (11) is arranged between the setting member (6) and a actuating-member element (actuating-member lever 14) on which the return spring (17) acts. In this way there is created a further prerequisite for the possibility, with the controllable coupling open, of commencing the emergency operation in the manner that the restoring force is overcome by the safety transmission element.

In a particularly advantageous manner, the device has the mechanical safety transmission element arranged on the actuating member, freely movable in direction of displacement (full-gas direction) by an amount of clearance (play) which is equal to a predetermined portion of the maximum path of displacement, in the manner that the safety transmission element has a stop which, after the clearance is exceeded, is coupled to the actuating-member element, having an equalization element via which, in opposition to the force of an over-stroke spring, the part of the safety transmission element which can be connected to the set-value transmitter is movable in the direction towards full gas and at the same time the setting member element is movable in the direction towards idling, wherein a transmission lever (20) to which the safety transmission element (emergency-operation rod 19) is pivoted as well as a actuating-member lever (14) as actuating-member element on which the controlled coupling as well as the return spring act, are turnable towards each other around a common axis (21), that the over-stroke spring (23) whose spring force is greater than that of the return spring rests on the one side at all times against the actuating-member lever (14) and on the other side, depending on the relative turning of the actuating-member lever with respect to the transmission lever within the clearance (cutout 26), rests against an extension (24) of the actuating-member lever which extends beyond the axis of rotation or, upon exceeding the clearance, against an edge (25) of a cutout (26) which is cut out from the transmission lever (20) and forms the clearance.

Due to the fact that the transmission lever and the actuating-member lever are turnable opposite each other and that the over-stroke spring in one direction of the relative movement rests on both sides only against the actuating-member lever and its extension, free-travel is formed. As a result thereof, the safety transmission element is relieved of load if, in the case of undisturbed operation, for instance, the control element—the gas pedal—is in the idling position while the speed of travel is automatically controlled via the electronic regulator and the setting member. The safety transmission element is also free of force in normal operation when the driver, to be sure, by actuating the control element but then electrically, displaces the actuating member via the electronic circuit and the electrical setting member. In the last-mentioned case of operation, as already mentioned, the clearance between one end of the over-stroke spring and an edge on the cutout of the transmission lever can have an effect if the edge moves opposite the direction of rotation at which the free-travel becomes active, towards the end of the over-stroke spring which rests against the extension of the actuating-member lever.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 3 shows a normal case of operation in which, with the control element moved into full-gas position by the electronic regulator, a limitation of speed or rpm takes place via the actuating-member lever;

FIG. 4 shows the device in the case of a disturbance or failure in which the actuating-member lever is actuated mechanically by the safety transmission means, particularly an emergency lever system, and no longer by the setting member; and FIG. 5 shows the device in a checking situation in which an error is simulated.

DETAILED DESCRIPTION OF THE PREFERRED EMBODIMENTS

Figure 1:
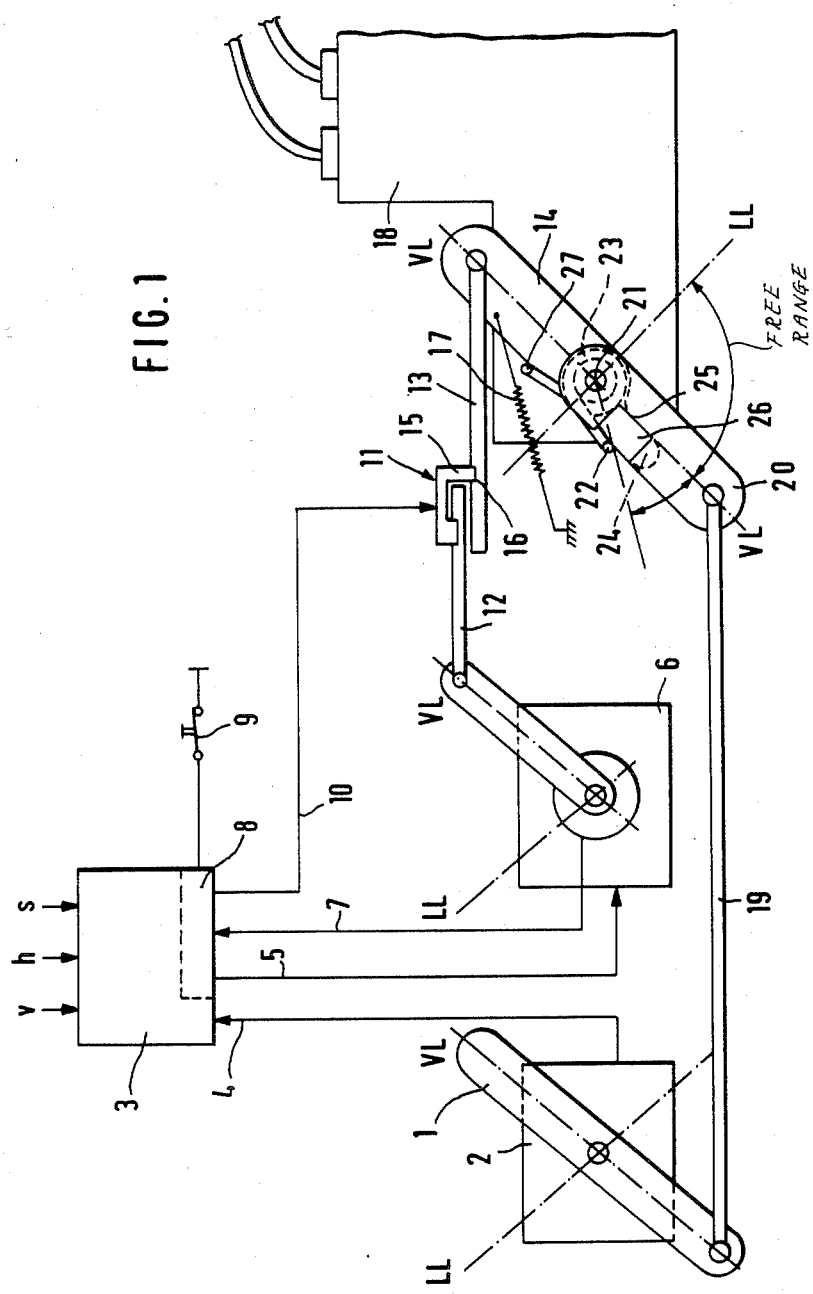
FIG. 1 is a diagrammatic showing of the arrangement in normal operation in which the position of the actuating-member element is set by electric follow-up control as a function of the position of the control element.

In FIG. 1, a control element 1 is shown which can be actuated in a vehicle and which can represent a gas pedal or a lever connected to a gas pedal. The control element is connected to an electric set-value transmitter 2 which gives off to an electronic regulator 3 an electric signal which corresponds to the position of the control element 1. "LL" is the idling position of the control element while the full-load position is abbreviated "VL." FIG. 1 therefore shows the situation of the device under full load or in the full-gas position of the control element. The abbreviations LL and VL are used also to characterize the position of the other components of the device.

The electronic regulator 3 has further inputs which are designated v, n and s. In this way it is indicated that the regulator is also adapted to effect a speed regulation or limitation as so-called regulating function and can recognize when a thrust disconnection is to take place (input s=thrust recognition). In connection with FIG. 1, only the electric signal given off by the set-value transmitter 2 at an input 4 of the regulator is of interest.

From an output 5 of the regulator an electric setting signal is fed into an electric setting member 6 which can consist, for instance, essentially of an electric motor and a gearing. From the setting member a report of the position of the setting member is sent back via an input 7.

The regulator furthermore comprises a part 8 designated by a broken line which operates in combination with a contact 9 actuatable by the driver as test signal transmitter as well as in combination with the input 7 as error detection device. This device is discussed further below in connection with FIGS. 4 and 5. From the regulator with the error-detection device 8 an electric output 10 extends to an electromagnetic actuating element (not shown) of a controlled coupling 11 which is developed as detent connection. The detent connection lies in the path of a setting-member frame having the setting-member rods 12 and 13 which can produce a mechanical connection between the electric setting member and an actuating-member lever 14. For this purpose, the controlled coupling 11 has a detent 15 which, actuated electromagnetically, engages in form-locked and force-locked manner in a groove 16 or else is removed from said groove when the actuating element is not energized.

The actuating-member lever which is acted on by a return spring 17 serves in the present example to displace the regulating rod of an injection pump 18. In other cases of use, the throttle valve of a carburetor can be actuated as actuating member instead of the control rod of the injection pump.

The device for automatically maintaining an emergency operating capability consists essentially of an emergency-operation rod 19 as mechanical safety transmission means between the control element 1 and the actuating-member lever 14.

The emergency-operation rod, however, does not act directly on the actuating-member lever but on a transmission lever 20 which is mounted for turning around a shaft 21, and is also turnable with respect to the actuating-member lever 14 which can be displaced around the same shaft 21. The transmission lever 20 can act only via one end 22 of an over-stroke spring 23 on the actuating-member lever 14. The over-stroke spring 23, which is shaped substantially cylindrical and is arranged coaxial to the shaft 21, can rest with the end 22 against an extension 24 of the actuating-member lever 14, which can be noted more clearly, for instance, from FIG. 2. The end 22 can, however, also come to rest against an edge 25 of a cutout 26 which is cut out of the transmission lever. The angle between the edge 25 and the dash-dot line through the point of contact of the end 22 of the over-stroke spring on the extension 26 when the front edges of the extension and of the transmission lever coincide is referred to as clearance. The angle by which the transmission lever can be moved further from the end 22 of the over-stroke spring up into the idling position is defined as free-travel. It is furthermore pointed out that a second end 27 of the over-stroke spring rests continuously against the front edge of the actuating-member lever 14. Between the ends 22 and 27 of the over-stroke spring, a moment can be transmitted which exceeds the moment which is exerted by the return spring 17 on the actuating-member lever 14.

In the normal operating case the position of the actuating-member lever of the actuating member thus is determined, when the controlled coupling 11 is closed, by the setting member 6 which receives an electric setting signal from the regulator 3. The position of the control element 1 is thus transmitted electrically to the actuating member. The electrical transmission takes place in accordance with the principle of follow-up control. A return signal which indicates the position of the setting member 6 is fed in this connection into the input 7 of the regulator 3. In an error-detection device within the regulator it is noted at the same time that the setting member is operating properly. Therefore, over the electrical output 10 of the error-detection device the controllable coupling 11 receives a signal, for instance a voltage, which maintains the coupling in closed condition.

In this normal operating case, the emergency operating rod 19 which acts on the control element is always so actuated that it could produce on the actuator lever 14 a displacement which is of the same size as the displacement of the actuating-member lever 14 produced by the setting member 6. In the normal operating case, however, the actuation of the emergency operating rod is isolated from the actuating-member lever 14. The emergency operating rod can, in that case of operation, not transmit any force-locking or torque to the actuating-member lever since the transmission lever 20 is moved either in a direction of rotation within the range of the clearance formed by the cutout 26 so that the end 22 of the over-stroke spring 23 does not come to rest against the edge 25 or else the transmission lever 20 is moved in the other direction of rotation still further from the end 22 of the over-stroke spring in the region of the free travel. A slight offset between the emergency operating rod 19 and the setting member rods 12, 13 can thus not have ay effect but, rather, even in this case the emergency-operation rod is carried along without force upon actuation of the control element.

In the operating cases which will be discussed below, use will be made of the same structure of the device as has been described in connection with FIG. 1. Individual parts of this device may, however, assume different positions.

Figure 2:
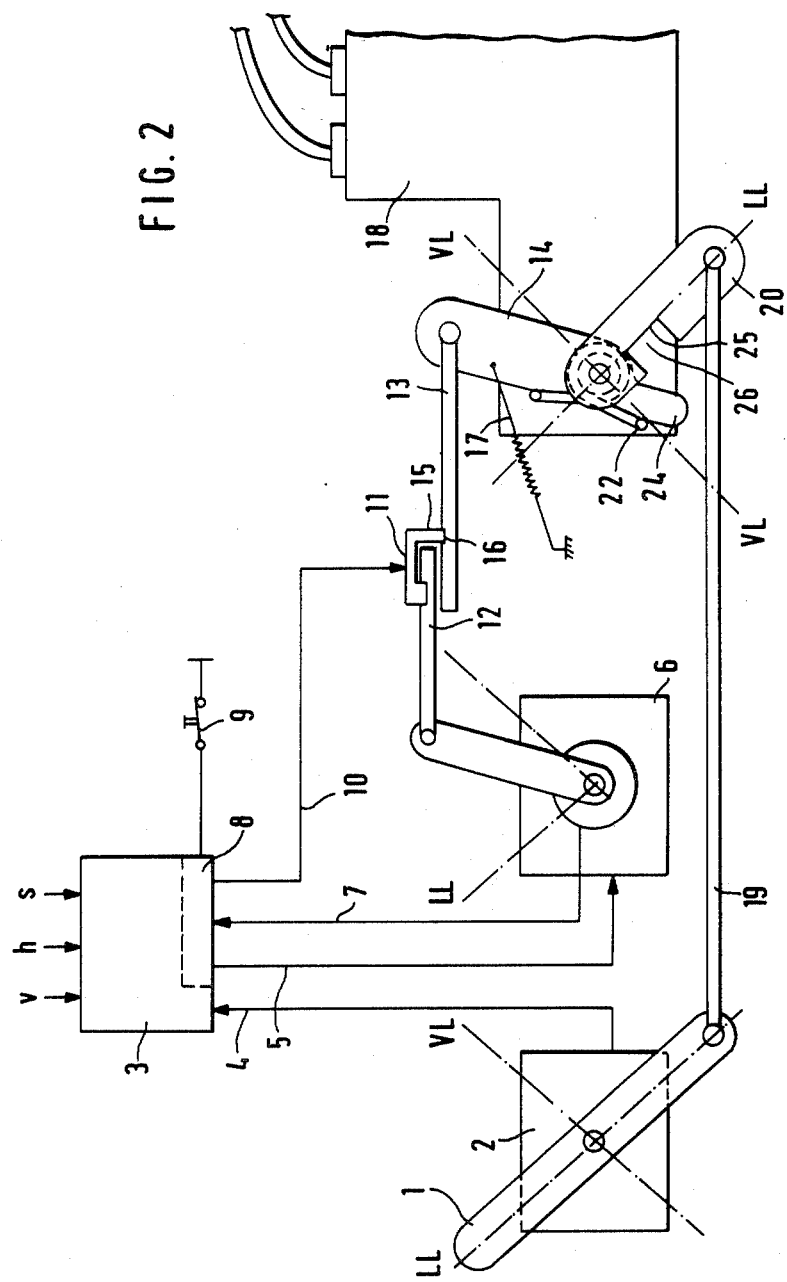
FIG. 2 shows the device in the case of operation in which, with idling position of the control element the actuating-member lever is determined by a regulating function, for instance an rpm or speed regulation.

In FIG. 2 there is also shown a normal operating position, namely an automatic regulating with respect to the speed of rotation of the combustion engine or the speed of travel of the vehicle by the electronic regulator 3 while no displacement of the actuating-member lever is to be effected by the driver of the vehicle and the control element actuated by him. In this normal condition of operation, the controllable coupling 11 is also closed as a result of the corresponding signal from the output 10 of the error-detection device 8. It may be assumed that the control element 1 is in the idling position or at least in a position which corresponds to a smaller flow of the fuel-air mixture than corresponds to the electric setting-member signal at the output 5 of the regulator 3. In this case therefore the actuating-member lever is regulated up as compared with the set-value transmitter position and the position of the emergency-operation rod 19. This takes place without introducing any force on the emergency-operation rod via the transmission lever 20 since the extension 24 of the actuating-member lever is moved away from the transmission lever.

In the situation shown in FIG. 3, an adjustment of the parts in an operation which is also normal is shown in which the position of the actuating member, however, is regulated downward automatically, i.e. is moved in the direction towards a smaller throughput of fuel-air mixture than corresponds to the position of the control element. This case of operation can be a limiting function which, for instance, is exerted upon reaching a maximum velocity or maximum speed of rotation by the regulator 3 which acts as limiter. By plausibility control of the report of the position of the setting member at the input 7 of the error-detection device, the controllable coupling 11 is maintained closed in this normal operating case also. As a result of the limiting function, the setting member 6 moves the actuating-member lever 14 in FIG. 3 in counterclockwise direction in order to regulate the internal combustion engine downward, while the control element of the set-value transmitter is, for instance, in the full-load position. The setting member can effect this rotation of the actuating member lever—supported by the return spring 17—in the manner that the moment exerted by the over-stroke spring on the actuating-member lever is overcome when the end 22 of the over-stroke lever rests against the edge 25, of the transmission lever 20. The emergency operating rod 19 is, to be sure, loaded in this special operating case with a force which corresponds to the moment introduced by the over-stroke spring on the transmission lever 20.

In the operating case of the device which is shown in FIG. 4 the device is disturbed; either the plant is without current or the setting member 6 is jammed. In any event the error-recognition device 8 recognizes that the position reported by the setting member at the input 7 does not correspond approximately to the position which has been ordered by the electric setting signal at the output 5 of the regulator. In this case, a signal occurs at the output 10 of the error recognition device; the voltage at this output preferably becomes zero in order to eliminate the detent connection of the controlled coupling 11 so that the latter is opened. The two setting member rods 12 and 13 can thus be displaced towards each other as shown in FIG. 4. In the assumed case of disturbance of the device, an emergency operation of the vehicle is made possible by the emergency-operation rod 19 which, as always, produces a position of the transmission lever 20 which corresponds to the position of the control element. The end 22 of the over-stroke spring resting against the extension 24 comes into contact with the edge 25 at the cutout 26 of the transmission lever 20 as soon as the clearance has been exceeded by the relative movement between transmission lever and actuating-member lever. The actuating-member lever can, via the over-stroke spring, be turned in this case further into a position which regulates upward the internal combustion engine since the over-stroke spring can overcome the restoring force of the return spring 17 and, as a result of the opened controllable coupling 11, the movement of the actuating-member lever is not further impeded. Accordingly, the emergency-operation rod 19 is also acted on substantially only by the restoring force.

In FIG. 4 it is indicated that the maximum position which the actuating member 14 can assume in the event of emergency operation remains behind the full-load position by an angle which corresponds to the clearance. In this way the driver of the vehicle furthermore has his attention called to the emergency driving situation and is told not to utilize the greatest possible power of the internal combustion engine in the case of this disturbance but to seek out a repair shop.

In FIG. 5, finally, there is shown the adjustment of the device when it is being tested as to whether the automatic emergency operation capability is assured. For this purpose, the contact 9 is opened and in a test-signal device—which may be included with the error-recognition device 8—a test signal is produced which corresponds to a case of disturbance. This means that the actuating element (not shown) of the controllable coupling 11 is without current or voltage and the coupling opens as in the case of a disturbance. It is then established whether, as shown in FIG. 5, the actuating-member lever can be turned between the maximum position for emergency operation by actuation of the control element. The uncoupling function of the controllable coupling 11 can be checked while the contact 9 remains open by the fact that a well-defined condition of operation of the load position, the speed of rotation or the thrust recognition is pre-established by corresponding signals at the inputs v, n, s of the regulator 3 and it is determined whether, despite the opened coupling, any change takes place in the operating condition of the internal combustion engine. This recognition can be effected automatically by a recognition device (not shown) which, for instance, determine variations of the speed of rotation of the engine from a predetermined value.

One particular advantage of the device is that due to the force-less traveling along of the emergency-operation device the function thereof cannot become incapable of operation by long-term disuse.

In the operation of the regulator 3, it is to be understood that the regulator is of a well-known form employed in motor vehicles. The output drive of the regulator 3 for operation of the setting member 6 is accomplished by way of a feedback signal from the setting member 6 applied via feedback input 7 to the regulator 3. The feedback assures that the regulator outputs sufficient power to drive the setting member 6 against a force of the stroke spring 23 during normal operation of the setting member 6, the regulator 3 and other elements of the vehicular control system. Thereby, the setting member 6 has sufficient power to pivot the lever 14 even if the rod 19 is stationary. In the event of a disruption in the operation of the system, as by a jam in the mechanical operation of the setting member 6 by way of example, the feedback path of the regulator 3 shows an error signal substantially larger than the value of error signal usually present in the feedback path of a regulator for motor vehicles. The device 8 connects with circuitry of the regulator 3 for sensing the magnitude of the feedback error signal. When the error signal magnitude rises above a preset threshold of the device 8, the device 8 provides an electric signal at output 10 indicating an operational failure or disruption of the vehicular control system. The signal at output 10 is applied to the coupling 11 to release the connection between rods 12 and 13 so that the rods 12 and 13 can move independently of each other. The lever 14 is then free to follow a pivotting of the lever 20 in accordance with displacement of the rod 19 for safe operation of the vehicle during system failure.

I claim:

1. In a device for transmitting the position of a control element for operation of the engine of a motor vehicle which control element is actuatable by the driver of a vehicle between an idling position and a full-gas position, there being a setting member and an electric transmission means and an electric set-value transmitter, which set-value transmitter is operated in response to the control element via said electric transmission means for displacing said setting member between an idling position and a full gas position in correspondence with displacement of the control element, said device comprising an actuating member which controls the fuel/air mixture of an internal combustion engine, said setting member being coupled by coupling means to said actuating member, there being at least one mechanical safety transmission element arranged between the control element of the set-value transmitter and the actuating member, by which transmission element the position of the control element can be transmitted to the actuating member; the improvement wherein said coupling means is formed as a controllable coupling arranged between the setting member and a lever of the actuating member, the coupling being responsive to a control signal for automatically opening in the case of a disturbance.

2. A transmitting device according to claim 1, wherein the controlled coupling is electrically controlled.

3. A transmitting device according to claim 1, wherein said coupling means comprises an electromagnetically actuated detent connection disposed between the setting member and the actuating member.

4. A transmitting device according to claim 1, wherein said coupling means comprises a pneumatic cylinder with piston arranged between the setting member and the actuating member and being actuatable by means of pressurized air or vacuum.

5. A transmitting device according to claim 4, wherein the pneumatic cylinder is connected to a vent valve for the decoupling of the actuating member from the setting member.

6. A transmitting device according to claim 1, wherein the electric transmission means includes a regulator;
an error-detection device which is coupled to the regulator; and
the coupling is controllable by a disturbance signal which is given off by the error detection device.

7. A transmitting device according to claim 6, wherein the detection device includes a test signal transmitter; and
the controllable coupling is openable by an arbitrarily actuatable signal of the test-signal transmitter.

8. A transmitting device according to claim 7, wherein the test signal transmitter gives off test signals to the setting member while the controllable coupling is simultaneously open.

9. A transmitting device according to claim 2, wherein
said control signal for said coupling is an electric current which terminates in the event of a disturbance and in a test case.

10. A transmitting device according to claim 1, further comprising
a return spring for urging the setting member into its idling position, the return spring acting on the actuating-member lever.

11. A transmitting device according to claim 1, wherein
the mechanical safety transmission element is connected to the actuating member, the safety transmission element being freely movable by displacement in the full-gas direction by an amount of clearance which is equal to a predetermined fraction of a maximum displacement of the safety transmission element; and wherein
the safety transmission element has a stop which, after the clearance is exceeded, contacts the actuating-member lever, the position transmitting device further comprising
an equalization element, an over-stroke spring, a transmission lever having a clearance cutout, a lever which is a part of the actuating member, and a return spring; and wherein
in opposition to the force of the over-stroke spring, the equalization element enables independent motion of the safety transmission element connected to the set-value transmitter and the setting member element;
the transmission lever is driven by the safety transmission element and is pivoted about a common pivot with the actuating-member lever, the controlled coupling and the return spring acting on the actuating-member lever; and
the over-stroke spring has a spring force which is greater than that of the return spring and rests on one side at all times against the actuating-member lever and on the other side, depending on the relative turning of the actuating-member lever with respect to the transmission lever within the clearance cutout, rests against an extension of the actuating-member lever which extends beyond the common pivot and, upon exceeding the clearance, rests against an edge of the cutout.

* * * * *